United States Patent [19]

Gu

[11] Patent Number: 5,247,847
[45] Date of Patent: Sep. 28, 1993

[54] CAM GEAR ASSEMBLY

[76] Inventor: Inhoy Gu, 420-503, Jukong Apt., Dunchon-Dong, Kangdong-Gu, Seoul, Rep. of Korea

[21] Appl. No.: 814,411

[22] Filed: Dec. 23, 1991

[30] Foreign Application Priority Data

Aug. 8, 1991 [KR] Rep. of Korea .................. 91-13677

[51] Int. Cl.$^5$ ............................................. F16H 1/04
[52] U.S. Cl. ........................................ 74/465; 74/422
[58] Field of Search .................................. 74/465, 422

[56] References Cited

U.S. PATENT DOCUMENTS

| | | | |
|---|---|---|---|
| 277,802 | 5/1883 | Stanley et al. ......................... | 74/465 |
| 598,629 | 2/1898 | Higgins .................................. | 74/465 |
| 673,352 | 4/1901 | Anderson .............................. | 74/465 |
| 860,536 | 7/1907 | Ellingham ............................ | 74/465 |
| 896,739 | 8/1908 | Mayo et al. .......................... | 74/465 X |
| 980,909 | 1/1911 | Bauschlicher ........................ | 74/465 |
| 3,108,488 | 10/1963 | Huszar ................................. | 74/465 |
| 3,399,578 | 9/1968 | Lindabury, Sr. et al. ......... | 74/422 X |
| 3,490,306 | 1/1970 | Hänsgen et al. .................... | 74/465 X |
| 3,718,051 | 2/1973 | Eck ....................................... | 74/422 X |
| 3,748,920 | 7/1973 | Lambev .............................. | 74/465 |
| 3,824,871 | 7/1974 | Loesch et al. ...................... | 74/422 |
| 3,975,969 | 8/1976 | Osborn et al. ...................... | 74/465 |
| 4,008,015 | 2/1977 | McDermott ....................... | 74/465 X |
| 4,282,777 | 8/1981 | Ryffel et al. ........................ | 74/465 |
| 4,879,920 | 11/1989 | Kerkhoff ............................. | 74/465 |
| 4,998,442 | 5/1991 | Brown et al. ...................... | 74/465 X |

FOREIGN PATENT DOCUMENTS 807908 1/1937 France .................................. 74/465

Primary Examiner—Leslie A. Braun
Assistant Examiner—Andrea Pitts
Attorney, Agent, or Firm—Hill, Steadman & Simpson

[57] ABSTRACT

A gear assembly with roller-cam contact by a cam gear with adjacent teeth forming a notch which defines a lobular periphery and a roller gear with a plurality 10A of rotatable rollers 10 is disclosed. Upon rotation, a roller rollingly contacts one of the sides of the lobular periphery and rollingly travels along the lobular periphery to rollingly contact the remaining side of the lobular periphery and with at least one of the teeth of the cam gear being in rolling contact with both a roller in an approach phase and with a roller in a recess phase to provide mechanical communication between the roller gear and the cam gear. A method of manufacturing the cam gear and the roller gear is also disclosed.

3 Claims, 6 Drawing Sheets

CAM GEAR ASSEMBLY

BACKGROUND OF INVENTION

1. Field of the Invention

The invention relates to a gear mechanism with a constant angular-velocity ratio, and more particularly to a gear assembly which includes a cam gear with a plurality of teeth which mechanically communicate with a plurality of equally spaced rotatable rollers mounted on a roller gear. The gear mechanical of the present invention eliminates the direct sliding contact during mechanical communication of the teeth of conventional gears.

2. Information Disclosure Statement

Mechanical communication between gears is the most rugged and durable means of power transmission. Generally, spur or helical gears are used to transmit motion between parallel shafts. Bevel gears are mounted on shafts of intersecting axes to transmit rotational motion therebetween. A rack and pinion gears convert translational motion into rotary motion, and vice versa. The basic gear-tooth geometry of these gears is the involute of a circle. They have a constant pressure angle at all points of contact.

However, mating gear teeth of conventional gears slide together, i.e. make sliding surface contact, which makes the gear teeth vulnerable to various types of surface damage when operated at high speed or under a heavy load. The sliding velocity tangential to the contact surfaces usually generates heat and noise. The increase of the contact ratio to reduce the contact stress is limited by the interference of mating gears. Furthermore, mating conventional gears have backlash which is the clearance between the adjacent teeth on the other side of a contacting tooth surface. Excessive backlash brings about impact loading whenever torque reversal occurs.

Therefore, it is an object of the present invention to provide a gear assembly which reduces frictional engagement.

It is a further object of the present invention to provide a gear assembly which reduces the amount of heat and noise generated during operation.

It is a further object of the present invention to eliminate direct sliding contact between gear teeth of conventional meshing gears.

It is a further object of the present invention to decrease frictional contact upon mechanical engagement of the teeth of mechanically communicating gears.

It is a further object of the present invention to provide a gear assembly which eliminates impact loading upon torque reversal.

The preceding objects should be construed as merely presenting a few of the more pertinent features and applications of the invention. Many other beneficial results can be obtained by applying the disclosed invention in a different manner or modifying the invention within the scope of the disclosure. Accordingly, other objects and a fuller understanding of the invention may be had by referring to both the summary of the invention and the detailed description, below, which describe the preferred embodiment in addition to the scope of the invention defined by the claims considered in conjunction with the accompanying drawings.

SUMMARY OF THE INVENTION

The gear assembly of the present invention is defined by the claims with a specific embodiment shown in the attached drawings. For the purpose of summarizing the invention, it relates to a gear assembly which comprises a cam gear 13 having a plurality of teeth 31 with each tooth having axis 13B and with adjacent teeth forming a notch 32 defining a lobular periphery 33 having a pair of sides 34, 35. The plurality of teeth of the cam gear are equally spaced apart relative to one another on the gear. A roller gear 11 is used which has a plurality 10A of rotatable rollers with each roller having an axis 11C and being eaually spaced apart relative to one another. The structure according to the present invention enables, in use, upon rotation of the cam gear and the roller gear, each roller to rollingly contact one of the sides of the lobular periphery and to roll along the lobular periphery thereby decreasing friction between the cam and roller gears upon mechanical engagement of the gears. The roller rolls along the periphery of the tooth of the cam gear except at the pitch point, i.e. the point where the roller is at the bottom of the notch and it stops rolling down one side and is just going to start to roll up the other side of the notch. At this point, the roller is not, for an instant, revolving along the periphery of the cam.

Preferably, the roller gear and the cam gear are configured so as at least one of the teeth of the cam gear is in rolling contact with both a roller in an approach phase and with a roller in a recess phase to provide mechanical communication between the roller gear and the cam gear.

Thus, upon reversal of torque, a roller in an approach phase becomes a roller in a recess phase, and a roller in a recess phase becomes a roller in an approach phase without the backlash displacement of conventional gears.

The cam gear and the roller gear each preferably have a circular shape. Preferably, the diameter of the cam gear is not smaller than the diameter of the roller gear in order to have double contacts between roller gear and cam gear.

The plurality of rollers of the roller gear may be configured to extend perpendicular to the plane of the roller gear or they may project from the plane of the roller gear at an angle oblique to the plane of the roller gear.

Each roller of the roller gear has an axisymmetrical shape, i.e. a shape that is symmetrical about its axis, and each notch of adjacent teeth of the cam gear has a surface contour to matingly receive at least a portion of the axisymmetrical shape of the roller to permit the roller to roll along the lobular periphery of the notch. Thus, each of the rollers on the roller gear may have a tapered-cylindrical shape, i.e. a tapered roller 20, or a cylindrical shape 11B. That is, where the axisymmetric shape of each roller is a cylindrical shape 11B, the surface contour of each notch is configured to matingly receive the cylindrical shape of the roller. Also, where the axisymmetric shape of each roller is of a tapered-cylindrical shape 20, the surface contour of each tooth is configured to matingly receive the shape of the tapered roller.

Reference is made as to the orientation of each of the rollers relative to the plane of the roller gear, in most cases, using the axis of the roller rather than the roller per se. This is to alleviate any ambiguity in roller orientation on a roller gear since the shape of the rollers among different roller gears can vary, i.e. cylindrical shaped rollers on the roller gear or tapered-cylindrical rollers on the roller gear to name a few. The axis of each tooth of the plurality of teeth may extend radially from the axis of cam gear, or the axis of each tooth of the plurality of teeth may extend perpendicular to the plane of the cam gear to define a cam gear rack 15, or the axis of each tooth of the plurality of teeth of the cam gear may project from the plane of the cam gear at an angle which is oblique to the plane of the cam gear. In like manner, the axis of each roller of the plurality of rollers may extend perpendicular to the plane of the roller gear 11, or the axis of each roller of the plurality of rollers may project from the plane of the roller gear at an angle oblique to the plane of the roller gear. Therefore, it is most preferred that the roller axis of each roller contacting with a cam gear is perpendicular to the axis of a contacting tooth of the cam gear.

Thus, in one embodiment of the present invention, each tooth (axis) of the cam gear is configured to extend in the plane of the cam gear and each roller (axis) of the roller gear is configured to extend perpendicular to the plane of the roller gear to enable mechanical communication between parallel shafts. In this embodiment, use of cylindrical rollers with each axis parallel to the axis of the roller-gear permits a perfect rolling contact between a gear tooth and rollers. However, use of other axisymmetric rollers may bring about slight slipping in addition to the rolling contact at a portion of the roller, even though their use may have an advantage of holding the roller gear normal to the plane of the roller gear.

In another embodiment of the present invention, each tooth (axis) of the cam gear is configured to extend perpendicular to the plane of the cam gear and each roller (axis) of the roller gear is configured to extend perpendicular to the plane of the roller gear to convert rotary motion into translational motion. In this embodiment the structure of the cam gear defines a cam gear rack 15 with an infinite radius. Use of cylindrical rollers with each axis parallel to the axis of the roller gear permits a perfect rolling contact between a gear tooth and rollers. However, use of other axisymmetric rollers may bring about slipping in addition to the rolling contact at a portion of the roller, even though their use may have an advantage of holding the roller gear normal to the plane of the roller gear.

In a further embodiment of the present invention, each tooth (axis) of the cam gear projects from the plane of the cam gear at an angle oblique to the plane of the cam gear and each roller (axis) of the roller gear projects from the plane of the roller gear at an angle oblique to the plane of the roller gear to enable mechanical communication between intersecting shafts. In this embodiment the cam gear is in a plane and an axis of each tooth of the plurality of teeth projects from the plane at an angle oblique to the plane of the cam gear. The roller gear is in a plane and an axis of each roller of the plurality of rollers projects from the plane of the roller gear at an angle oblique to the plane of the roller gear. Each roller has a tapered-cylindrical shape 20 and each tooth has a surface contour which is configured to matingly receive the tapered-cylindrical shape to enable mechanical communication between intersecting shafts having mounted thereon the cam gear and the roller gear, respectively. The conical apex of each tapered roller should be at an intersecting point of the intersecting shaft axes for a perfect rolling contact between a gear tooth and rollers. However, use of other axisymmetric rollers may bring about slight slipping in addition to the rolling contact at a portion of the roller, even though their use may have an advantage of holding the roller gear normal to the plane of the roller gear.

The shape of the teeth used in the gears according to the present invention makes possible the rolling contact between the meshing gear teeth rather than the direct sliding contact between meshing gear teeth which occurs in conventional gears. The gear tooth shape during the approach of a roller is symmetrical about the tooth axis to the shape during the recess of a roller, so the gear can be rotated in either direction, as discussed below. The cam gear performs both conjugate gear tooth action as well as cam action and hence its name.

Before a roller completes its recess from the tooth of the cam gear, another roller begins its approach on the same tooth of the cam gear. As two or more rollers are always in contact with the cam gear, the cam gear does not lose engagement with the rollers. This is the preferred configuration of the gear assembly.

The present invention also includes the cam gear, per se, for use with the roller gear to enable mechanical communication therebetween. The cam gear comprises a gear having a plurality of teeth 31 with each tooth having a lobular shape and with adjacent teeth forming a notch defining a lobular periphery having a pair of sides and with the plurality of teeth being equally spaced apart relative to one another about the cam gear.

The present invention also includes the roller gear, per se, for use with a cam gear to enable mechanical communication therebetween. The roller gear comprises a gear with a plurality 10A of rotatable rollers 10 with each roller being equally spaced apart relative to one another in rotational symmetry about the roller gear.

The present invention also provides a gear cutting method by a process in which the cutting tools of the size and shape of the rollers are positioned at the roller axes, and both the gear blank and the cutter-bearer are rotated about each shaft axis. The method for manufacturing a cam gear having a plurality of teeth 31 with adjacent teeth forming a notch defining a lobular periphery having a pair of sides and with the plurality of teeth being equally spaced apart relative to one another is also part of the present invention. The method comprises providing a gear blank and a gear cutting machine having at least one rotatable roller-shaped cutter positioned on a rotatable cutter-bearer for forming the notch which defines the lobular periphery in the gear blank. The gear-blank is operatively mounted on the gear cutting machine so as to contact at least one rotatable roller-shape cutter of the gear-cutting machine. The roller-shaped cutter is rotated to cut into the gear-blank a predetermined distance to initiate cutting of the notch. Then, both the gear-blank and the rotatable cutter bearer are rotated such that during the co-rotation of the gear-blank and the cutter bearer, at least one of the sides of the lobular periphery is cut into the gear-blank by the rotating roller-shaped cutter.

Most preferably, a plurality of rotatable roller-shaped cutters equally spaced apart relative to one another are mounted in rotational symmetry on the periphery of the rotatable cutter-bearer.

The gear-blank and the rotatable cutter-bearer may be operatively positioned in the gear-cutting machine in the same plane during the cutting step, or the gear-blank and the rotatable cutter-bearer may be operatively positioned in the gear-cutting machine in different planes during the cutting step. The gear-blank and the cutter-bearer preferably co-rotate so that both the same circumferential velocity at a pitch point defined as an intersecting point between a path circle of a cutter center and a plane connecting both axes of the cutter-bearer and the gear blank.

In the method for fabricating the cam gear it is preferred that during co-rotation of the roller-shaped cutter and the gear-blank at least one of the teeth being formed in the gear-blank is in contact with both a roller-shaped cutter of the cutter-bearer in an approach phase and with a roller-shaped cutter of the cutter-bearer in a recess phase to provide the formation of a tooth therebetween.

The roller gear may be fabricated by securely positioning a plurality of shafts about the periphery of a gear and rotatably securing a roller to each of the shafts. The shafts positioned about the perimeter of the roller gear may be integrally formed with the roller gear or may be separately formed and inserted into bores formed in the roller gear. Preferably, a mechanical bearing, such as a journal or ball bearing, is utilized between the roller and the shaft.

The more pertinent and important features of the present invention have been outlined above in order that the detailed description of the invention which follows will be better understood and that the present contibution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purpose of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be had to the following detailed description taken in conjunction with the accompanying drawings in which.

Similar reference characters refer to similar parts throughout the several views of the drawings.

DETAILED DESCRIPTION OF THE INVENTION

Figure 1:
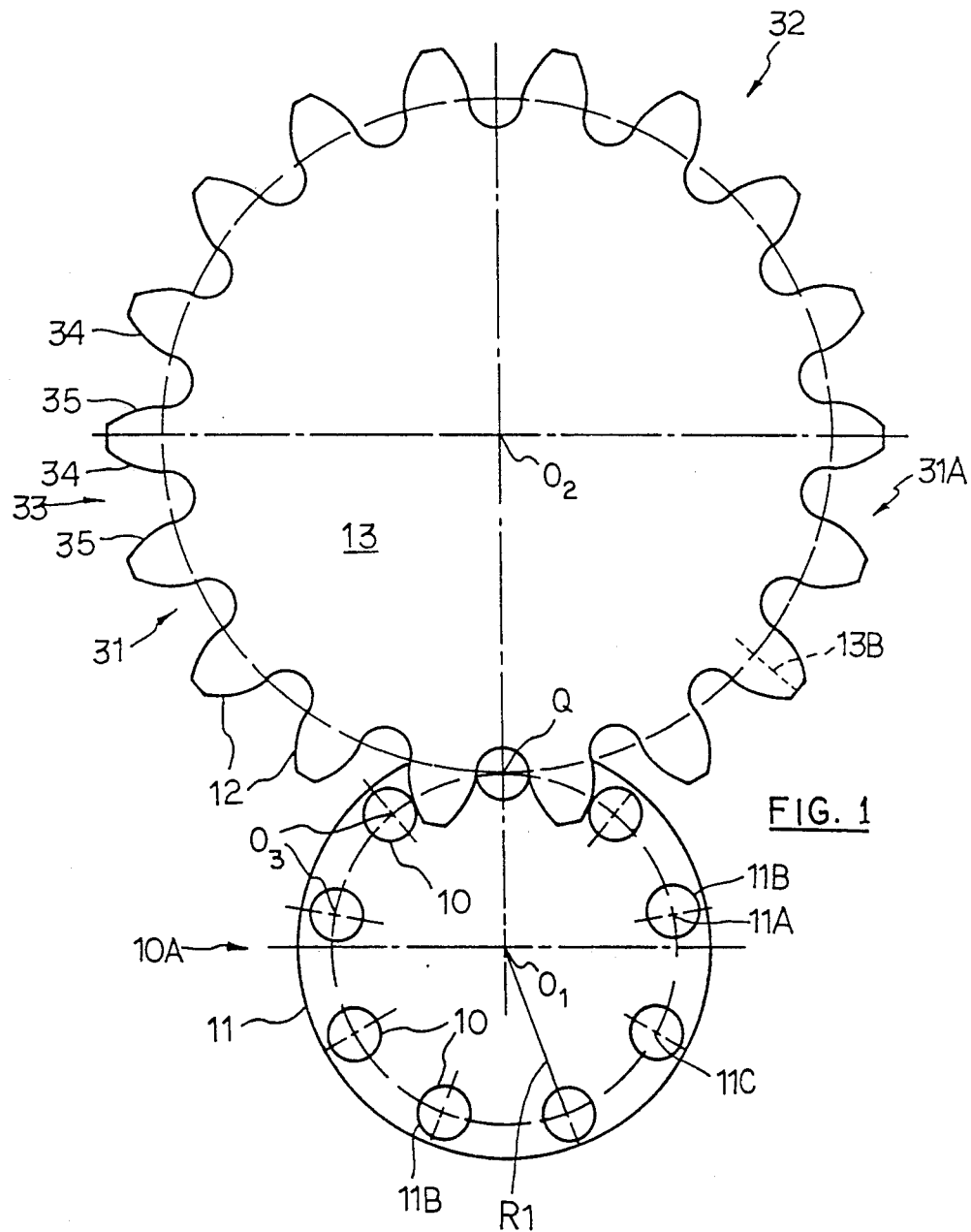
FIG. 1 is a side elevational view of the first embodiment of the present invention.

FIG. 1 illustrates the structure of the first embodiment of the present invention which replaces the conventional spur gear mechanism.

The roller gear 11 has a plurality 10A of rotatable rollers 10 with each roller being equally spaced apart relative to one another on the gear and having an axis 11C. The axis of each roller of the plurality 10A of rotatable rollers 10 is configured to extend perpendicular to the plane of the roller gear which is the same as the plane of the paper illustrating the roller gear 11 at FIG. 1. Thus, the rollers extend out of the plane of the paper illustrating FIG. 1 and are of a cylindrical shape 11B. As discussed above, each roller of the roller gear 11B has an axisymmetrical shape, i.e. a shape which is symmetrical about its axis, and therefor reference is made to the orientation of the rollers using the axis of the roller rather than the roller itself since the shape of the roller can vary among different gears. Orientational reference made to just the roller itself herein should be considered in this context. The teeth of the cam gear must be also considered in this context since a notch of the cam gear matingly receive at least a portion of a roller of the roller gear.

The cam gear 13 has a plurality of teeth 31 with each tooth 13A having a lobular shape 31A and with adjacent teeth forming a notch 32 defining a lobular periphery 33 having a pair of sides 34, 35 and with the plurality of teeth being equally spaced apart relative to one another. The teeth of the cam gear are configured to extend in the plane of the cam gear which is the same as the plane of the paper illustrating the cam gear 13 at FIG. 1.

A cam gear 13 is rigidly secured to a shaft $O_2$ and a roller gear 11 is rigidly secured to a shaft $O_1$. Here the cam gear replaces a conventional larger gear and the roller gear replaces a conventional smaller gear, i.e. pinion gear.

The plurality 10A of rotatable rollers 10 are used with each rotatable roller being rotatably mounted on the roller gear 11 at an equal-angular space $\theta_o$ relative to an adjacent roller and at an equal distance $R_1$ from the center $O_1$. Thus the angle $\theta_o$ is 360 degrees divided by the number of rollers. Either the shaft $O_1$ or shaft $O_2$ can be a driving or a driven shaft. Rotation of the shaft $O_1$ through the angle $\theta_o$ causes the cam gear 13 to rotate about $O_2$ through an equally-spaced angle of gear teeth. Accordingly, the angular velocity ratio of a cam gear to the roller gear is the same as the ratio of the number of rollers to the number of gear teeth. For example, a roller gear having ten rollers is rotaing twice as fast as a cam gear with twenty gear teeth.

Figure 2:
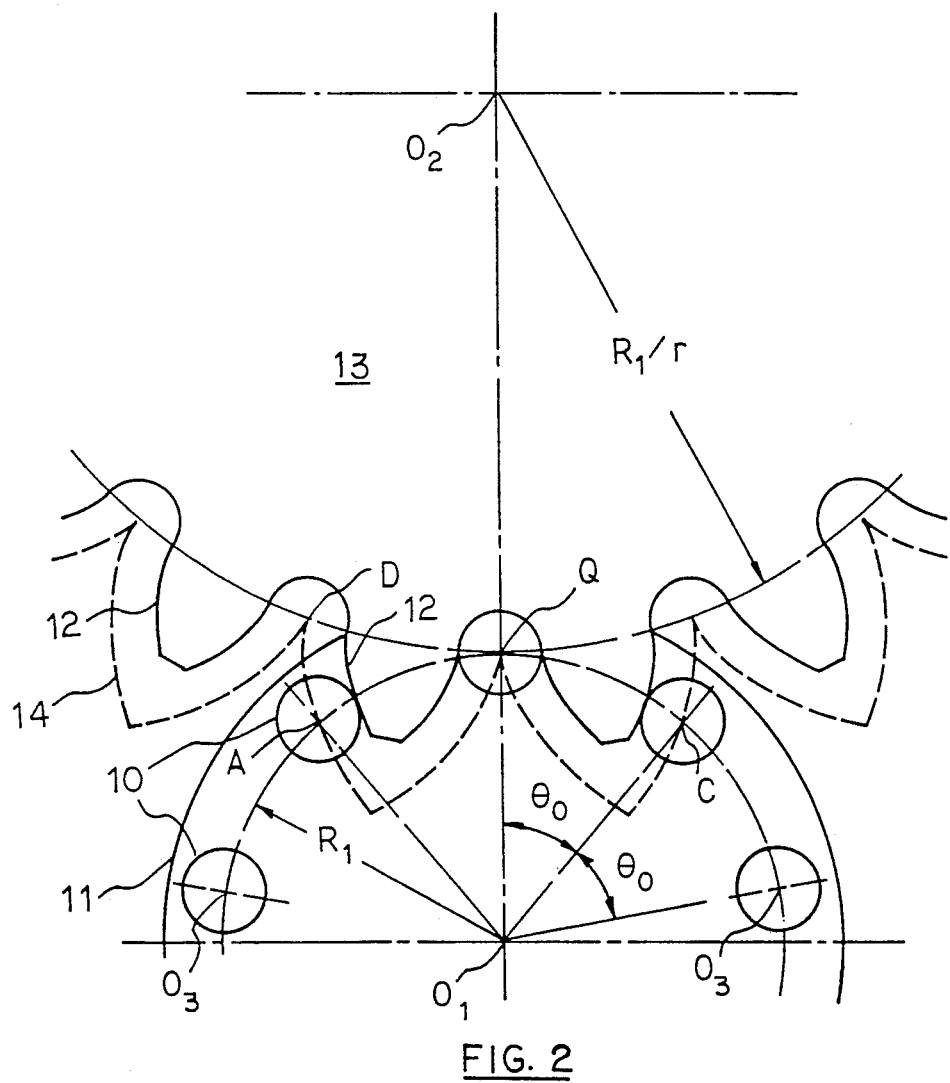
FIG. 2 is a detailed view of gear-roller contacts of FIG. 1, with a pitch curve which is the path of the roller center on the cam-gear plane.

FIG. 2 illustrates in greater detail the meshing of the cam gear 13 and and roller gear 11 of FIG. 1. Thus, it can be seen that the cam profile 12 on the side of the roller 10 at "A" is symmetrical about the radial line $O_2Q$ to the cam profile 12 on the side of the roller 10 at "C". Thus, the shafts $O_1$ and $O_2$ can rotate in either direction.

Upon clockwise rotation of the shaft $O_1$, for instance, the roller at "A" is in an approach phase, the roller at "C" in a recess phase, and the roller at "Q" is changing from an approach to a recess phase. That is, at this moment three rollers of the roller gear are in contact with the cam gear. Movement of the roller 10 from the position "Q" to the position "C" brings another roller 10 to the position "A". When the roller at "C" completes its recess before another roller begins its approach on the other side, then two rollers make contact with the cam gear 13. Since there are always two or more points of contact between the gears, at least one in approach and the other(s) in recess, the motion of the cam gear is securely controlled by the rotation of a roller gear 11 so that cam gear 13 can not jump from the roller 10.

The pitch curve 14, illustrated as a dashed line in FIG. 2, is the path of the roller center $O_3$ on the plane of a cam gear 13 while the roller 10 is in mesh with the cam gear 13. The cam profile 12 is determined by the distance of the roller radius from the pitch curve 14. The common normal to the surfaces at the contact point in FIG. 2 should intersect the line of centers at the pitch point "Q" dividing the center distance $O_1O_2$ by the angular velocity ratio. Thus, the point on the cam profile 12 must lie on the common normal in the distance of a roller radius from the center of roller. Conventional gears have a constant pressure angle. However, in the present invention, the pressure angle, as the roller 10 moves from the position "A" to the position "Q", varies from $\theta_o/2$ to zero. Here the angular velocity ratio is designated r, less than 1.

Figure 3:
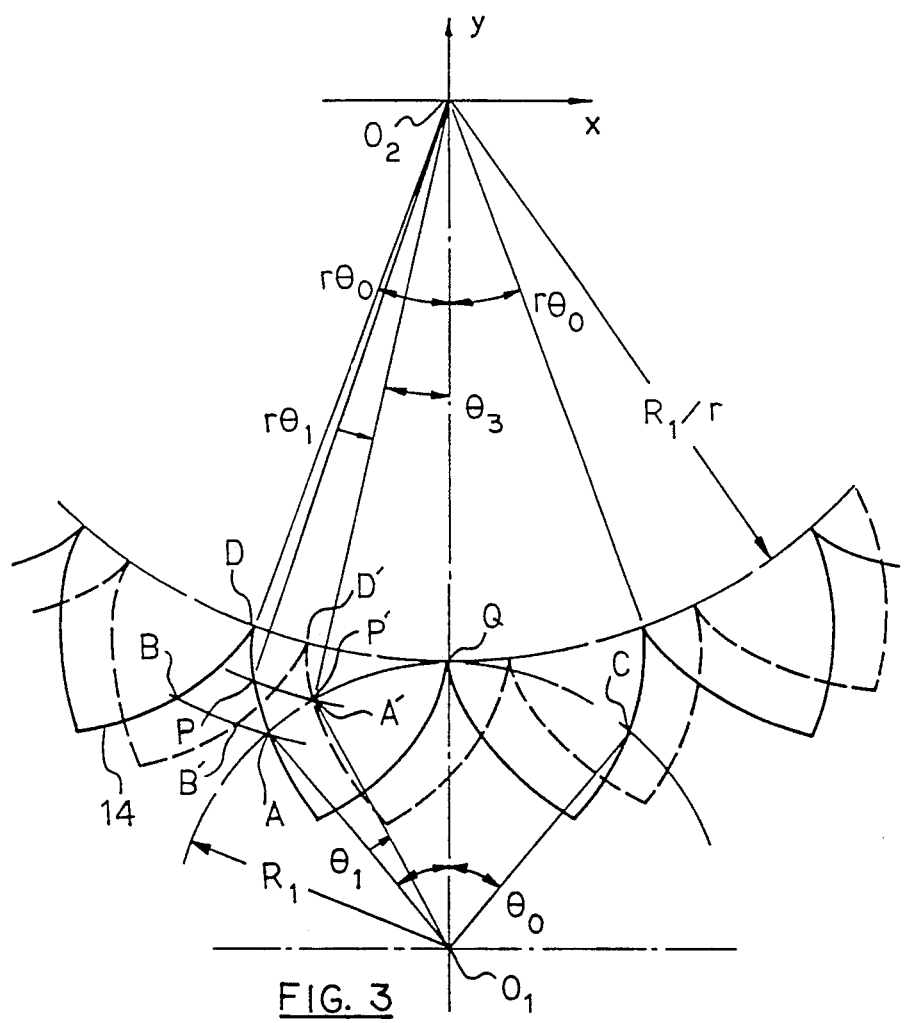
FIG. 3 shows coordinates to calculate the pitch curve of the roller center on the cam gear plane.

The coordinates of a pitch curve 14 are illustrated in FIG. 3, where the roller center $O_3$ are in the radial distance $R_1$ from the shaft $O_1$, and the pich point "Q" is on the centerline in the distance $R_1/r$ from the shaft $O_2$. Clockwise rotation of the roller gear through the angle $\theta_o$ moves the roller at "A" to the position "Q" while the cam gear rotates counterclockwise through the angle $r\theta_o$ about the point $O_2$, from the position "D" to the position Q. The angle $r\theta_o$ is the angle between adjacent cam gear teeth. Further rotation of the roller through the angle $\theta_o$ brings the said roller to the position "C".

The calculation of coordinates of the pitch curve is explained as follows. While the roller at "A" rotates clockwise through an angle $\theta_1$ to the position P', the pich curve APDB in the solid line rotates counterclockwise through the angle $r\theta_1$ to the pitch curve A'P'D'B', represented by the dashed line in FIG. 3. The coordinates of the point P on the pitch curve are calculated using the coordinates of the point P'. In terms of the center distance $O_1O_2=d$, the distance of roller center from the shaft $O_1$ is $$O_1Q = O_1O_3 = R_1 - \frac{d}{1 + 1/r}$$

The angle $\theta_3$ of the point P' from the center line is $$\theta_3 = \arctan\left[\frac{R_1 \sin(\theta_o - \theta_1)}{R_1 - R_1\cos(\theta_o - \theta_1) + R_1/r}\right]$$

and the radial distance of the point P' is $$O_2P = \frac{R_1 \sin(\theta_o - \theta_1)}{\sin \theta_3}$$

The point P is obtained by rotating the point P' clockwise through the angle $r\theta_1$.

$$x-\text{coordinate of point } P = -O_2P \sin(r\theta_1 + \theta_3)$$

$$y-\text{coordinate of point } P = -O_2P \cos(r\theta_1 + \theta_3)$$

In the above equations, incremental variations of the angle $\theta_1$ from zero to $\theta_o$ determine the curve AD, which corresponds to the phase of the roller approach from "A" to "Q". Incremental variations of the angle $\theta_1$ from $\theta_o$ to $2\theta_o$ determine the curve DB, which corresponds to the recess of the said roller from "Q" to "C". The said two curves AD and BD are symmetrical to each other about the radial line $O_2D$, so the cam gear can rotate in either direction. The pitch curve prior to the point "A" is calculated from the above equations by varying the angle $\theta_1$ incrementally from $-\beta$ to zero, in which the angle $\beta$ satisfies the following condition.

$$\left(1 + \frac{1}{r}\right)\sin\left(r\beta + \frac{r\theta_0}{2}\right) = \sin\left(\theta_0 + \beta + r\beta + \frac{r\theta_0}{2}\right)$$

The pitch curve beyond the point B is calculated similarly by varying the angle $\theta_1$ from $2\theta_o$ to $2\theta_o+\beta$, in which the angle $\beta$ also satisfies the above condition. The cam profile corresponding to the pitch curve prior to "A" and beyond "B" is introduced to increase the number of contact points between cam gear and rollers. In order to get the entire cam profile, the cam profile corresponding to the pitch curve ADB and its extended part should be repeated rotationally in an angular-space $r\theta_o$ about the point $O_2$. Accordingly, 360 degrees divided by $r\theta_o$ degrees should be the same as the number of cam-gear teeth.

Figure 4:
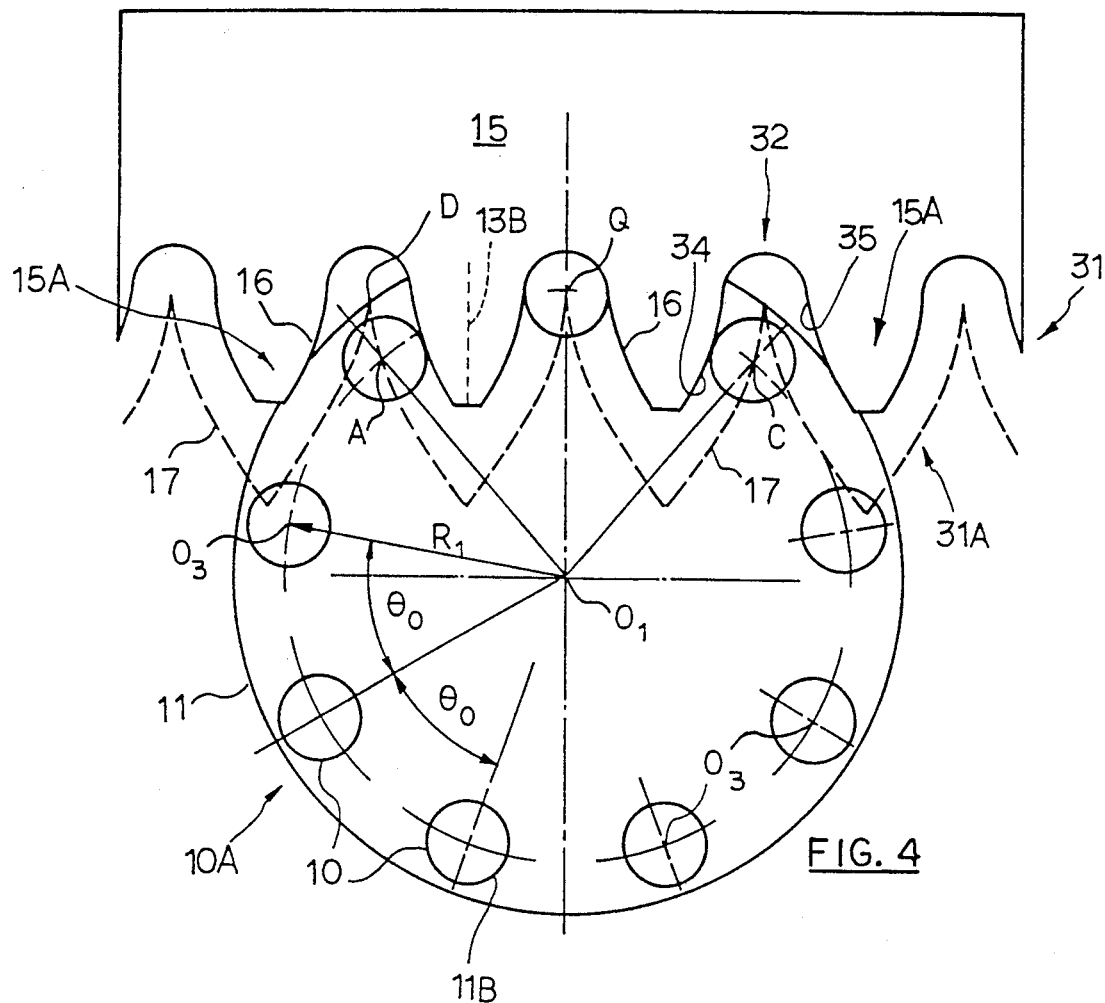
FIG. 4 is a side elevational view of a cam gear rack to convert rotary motion into translational motion, and vice versa, a second embodiment of the present invention.

As illustrated at FIG. 4, in the second embodiment of the present invention, each tooth 15A (axis) of the cam gear 15 is configured to extend perpenicular to the plane of the cam gear and each roller 10 (axis) of the roller gear 11 is configured to extend perpendicular to the plane of the roller gear to convert rotary motion into translational motion. The rollers 10 of the roller gear 11 are configured to extend perpendicular to the plane of the roller gear paper which is the same as the plane of the paper illustrating the roller gear 11 at FIG. 4. Thus, the rollers extend out of the plane of the paper illustrating FIG. 4 and are of a cylindrical shape 11B. The plane of the cam gear 15 is perpendicular to the plane of the paper illustrating the cam gear 15 at FIG. 4. Thus, each tooth 15A of the cam gear 15 is configured to extend perpendicular to the plane of the cam gear.

Thus, in the second embodiment shown in FIG. 4, the structure is similar to the above-described embodiment except that the angular velocity ratio r goes to zero and the pitch radius of a cam gear is infinite. This embodiment converts rotary motion into translational motion, and vice versa. The translational part can be called a cam gear rack 15 as it performs gear rack action as well as cam action. The revolvable rollers 10 are mounted on a roller gear 11 in an equal-angular space $\theta_0$ and in an equal distance $R_1$ from the shaft $O_1$. The rollers 10 and roller gear 11 perform the action of a pinion. While the roller bearer 11 rotates clockwise through the angle $\theta_0$ about the shaft $O_1$, the cam gear rack 15 moves to the right in the distance $R_1\theta_0$. The roller gear 11 rotating in counterclockwise direction causes the cam gear rack 15 to move to the left. The cam gear rack 15 has a repeated shape of the segment $R_1\theta_0$. There should be two or more points of contact between a cam gear rack 15 and rollers 10. Among them, at least one contacting roller is in the approach and the other contacting roller(s) is in the recess. Thus, the cam gear rack 15 does not lose contact with the rollers 10 during operation. The common normal to the contact surfaces at the point of contact should intersect the pitch point "Q" and the roller center in FIG. 4, where the dashed line is the pitch curve 17. Thus the cam profile 16 is determined in the distance of a roller radius from the pitch curve 17.

Figure 5:
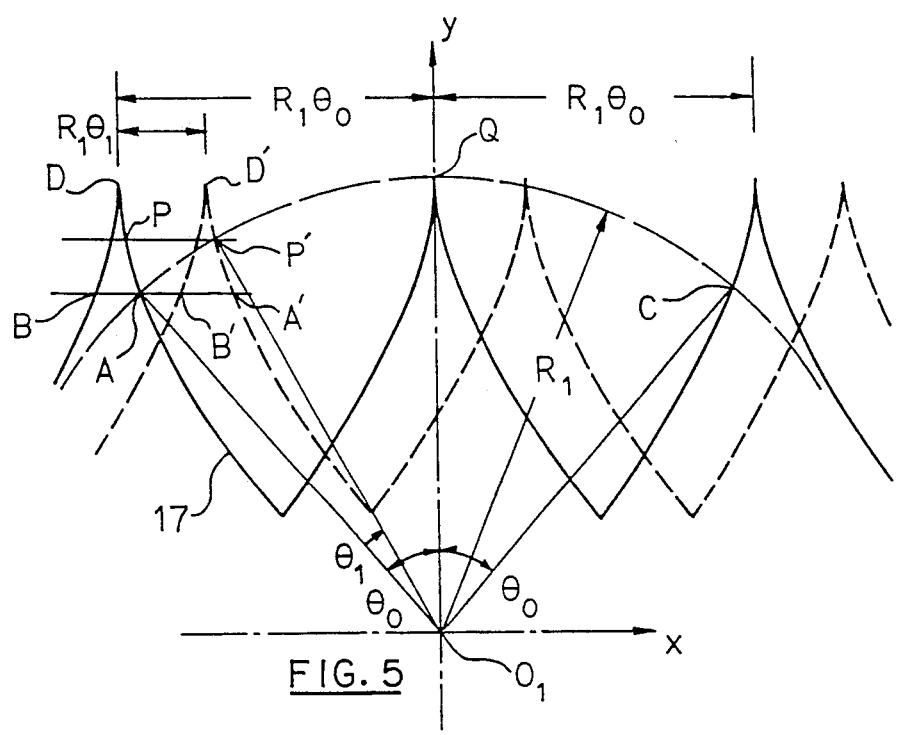
FIG. 5 shows coordinates to calculate the pitch curve of the roller center on the cam gear rack plane.

The coordinates of the pitch curve 17 are shown in FIG. 5, where the pitch curve in the solid line is displaced to the dashed position by a clockwise rotation of the roller bearer 11 through an angle $\theta_1$ about the shaft $O_1$. While the roller center at "A" rotates to the position P', the pitch curve APDB moves to the position A'P'D'B' in the distance $R_1\theta_1$. The coordinates of the point P are calculated from its displaced position P'.

$x$—coordinate of point $P = -R_1\theta_1 - R_1 \sin(\theta_0 - \theta_1)$ $y$—coordinate of point $P = R_1\cos(\theta_0 - \theta_1)$ The contact point on the cam profile 17 is also displaced by the rotation of the roller gear, and the displaced point is on the line P'Q in the distance of a roller radius from the point P'. The pitch curve "AD" is determined from the above equations in the incremental variations of the angle $\theta_1$ from zero to $\theta_0$. The pitch curve "DB" is similarly calculated by varying the angle $\theta_1$ incrementally from $\theta_0$ to $2\theta_0$. These two curves "AD" and "DB" are the pitch curves of the roller during approach and recess, respectively, in the clockwise rotation of the roller bearer about the shaft axis $O_1$. The curves "AD" and "DB" are symmetrical to each other, so the shaft $O_1$ can rotate in either direction. The pitch curve prior to the point "A" is also calculated from the above equations by varying the angle $\theta_1$ incrementally from $-\phi$ to zero, and the angle $\phi$ satisfies the following condition.

$\sin(\phi+\theta_0) = \phi + \theta_0/2$

The pitch curve beyond the point "B" is calculated similarly by varying the angle $\theta_1$ from $2\theta_0$ to $2\theta_0 + \phi$, and the angle $\phi$ satisfies the above condition.

Figure 6:
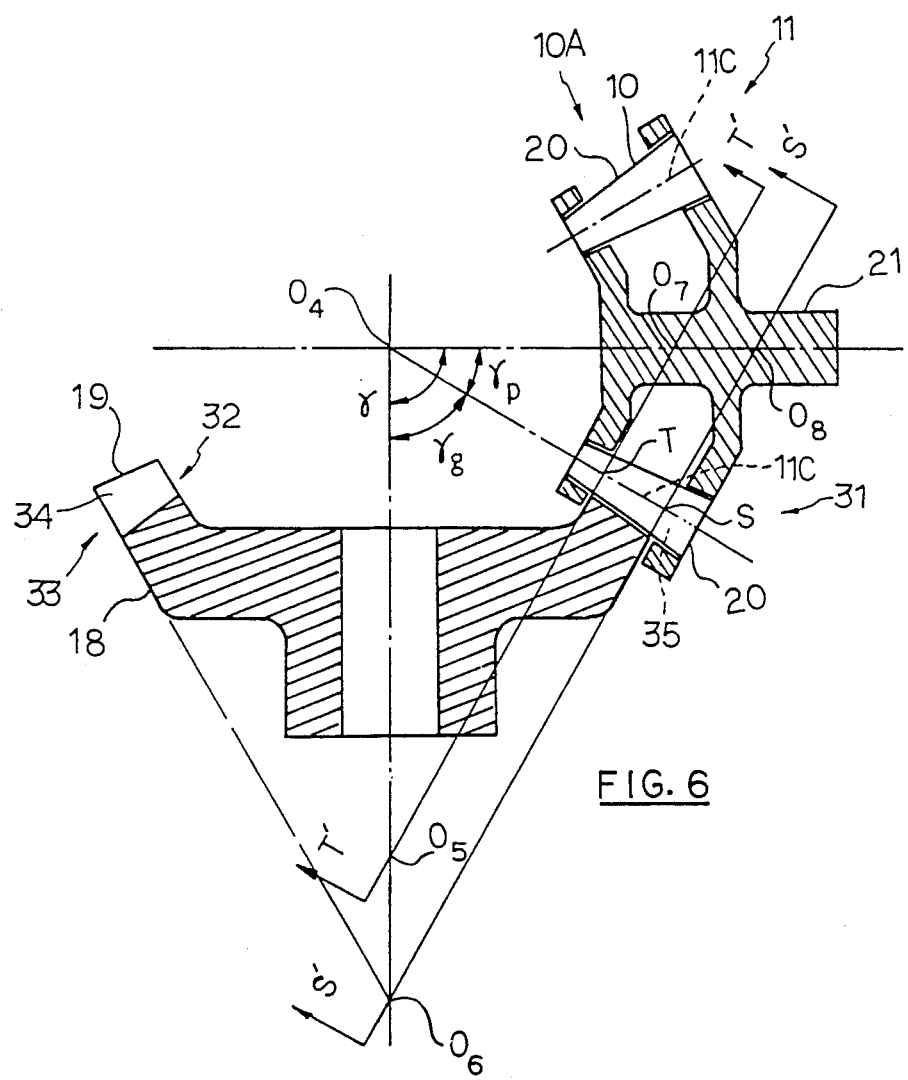
FIG. 6 is a schematic side view of the cam gear for transmitting rotary motion between intersecting shafts, a third embodiment of the present invention.

A third preferred embodiment of the gear apparatus according to the present invention is shown in FIG. 6.

As illustrated, the each of of the rollers (axes) of the roller gear is configred to project from the plane of the roller gear at an angle oblique to the plane of the gear. The plane of the roller gear is the perpendicular to the plane of the paper illustrating the roller gear 21 at FIG. 6 Thus, the rollers extend at an angle oblique to the plane of the roller gear as illustrated at FIG. 6. The teeth (axis) of the cam gear 18 are configured to project from the plane of the cam gear at an angle oblique to the plane of the cam gear. The plane of the cam gear is perpendicular to the plane of the paper illustrating the cam gear 18 at FIG. 6. Thus, the teeth extend at an angle oblique to the plane of the cam gear as illustrated at FIG. 6.

The gear assembly of FIG. 6 is used in the place of bevel gear mechanism to transmit rotation between intersecting shafts. This structure is similar to the first embodiment of the invention except that the cam surface as well as the rollers are made of conical elements. The extended conical elements intersect at the common apex $O_4$ on the centerline of rotation. A tapered cam gear 18 is positioned at a conventional bevel gear, and the roller gear 21 of tapered rollers 20 is positioned at a conventional bevel pinion. Equally-spaced rollers 20 are free to revolve about respective roller axes. The rotation of the pitch-point line $O_4S$ about respective shaft axes develops pitch cones. In terms of the angle $\gamma$ between intersecting shaft axes and the angular velocity ratio r, less than 1, the pitch cone angle $\gamma_g$ of the tapered cam gear 18 in FIG. 6 is $$\gamma_g = \arctan\left(\frac{\sin \gamma}{r + \cos \gamma}\right)$$

The pitch cone angle of the roller bearer 21 is $\gamma_p = \gamma - \gamma_g$. The angular velocity ratio "r" is the same as the ratio of number of rollers $N_p$ to the number of cam-gear teeth $N_g$.

$r = N_p/N_g$

Rotation of the lines perpendicular to the pitch-point line $O_4S$ about respective shaft axes develops back cones. The pitch cone and back cone elements are perpendicular to each other. The size and shape of the tapered cam gear 19 are characterized as those of an imaginary cam gear appearing on the developed back cone. The cam profile on the section S'S' in FIG. 6 is calculated in the same way as in the first embodiment, since the lines $O_6S$ and $SO_8$ in FIG. 6 correspond to the lines $O_2Q$ and $QO_1$ in FIG. 2, respectively. The cam profile on the section T'T' in FIG. 6 is obtained in the same way as in the first embodiment, since the lines $O_5T$ and $TO_7$ in FIG. 6 correspond to $O_2Q$ and $QO_1$ in FIG. 2, respectively. The shapes of cam profile on the sections perpendicular to the pitch-point line $O_4S$ are similar, and the size is proportional to the distance of pitch point from the pitch-cone apex $O_4$. The tapered cam gear 19 makes contact with two or more tapered rollers 20 at a time, at least one in approach and the other(s) in recess. Therefore, the tapered cam gear does not lose contact with the rollers.

The cam gear of the first embodiment, the cam gear rack of the second embodiment, and the tapered cam gear of the third embodiment can be directly cut by a numerical cutting machine using the coordinate values of the cam profile in the foregoing description. A more productive and accurate method of the manufacture is a generating process of gear cutting, in which cutting tools of the size and shape of the rollers are positioned at the roller axes and turned to cut the gear blank while the blank and the cutter-bearer are made to rotate about each axis of shaft rotation in such a angular velocity ratio that both are a conjugate pair.

The cam gear rack of the second embodiment can be manufactured in a generating process by feeding the blank to cutters of the size and shape of the rollers, in which the cutters are positioned at the roller axes. The cutter bearer is made to rotate about its axis of shaft rotation while the blank is fed perpendicular to the cutter shaft so that both have a same velocity at the pitch point.

The tapered cam gear of the bevel-gear type is manufactured in a generating process by positioning cutting tools of the size and shape of the tapered rollers at the roller axes and rotating both the gear blank and the cutter-bearer about each axis of the shaft rotation in such a angular velocity ratio that both are a conjugate pair. Advantages are evident in the simple shape of the cutters.

Although the invention has been illustrated by way of the several preferred embodiments thereof, it should be understood that various changes and modifications may be made in the form, construction and arrangement of the parts without departing from the spirit and scope of the invention.

What is claimed is:

1. A gear assembly with a constant angular-velocity ratio comprising:
   a roller gear with a plurality of rotatable rollers with each roller having an axis and a radius and being equally spaced apart relative to one another in rotational symmetry; and
   a cam gear having a plurality of teeth with adjacent teeth forming a notch defining a lobular periphery having a pair of sides, said plurality of teeth equally spaced apart relative to one another in rotational symmetry to provide a cam-gear profile such that, in use, upon rotation of said cam gear and said roller gear, each said rollers rollingly contacts one of said sides of said lobular periphery and rolls along said lobular periphery, wherein at least one of said teeth of said cam gear is in rolling contact with both a roller of said roller gear in an approach phase and with a roller of said roller gear in a recess phase to provide mechanical communication between said roller gear and said cam gear at a constant angular-velocity ratio without loss of contact between said cam-gear tooth and said rollers and where a pitch curve of said cam-gear tooth along which said axis of each said roller travels is defined by said cam-gear profile distanced by said radius of each said roller from each said cam-gear tooth, and x and y coordinates of said pitch curve in the origin of the center of said cam gear are defined by:

$$R_1 = \frac{d}{1 + 1/r}$$

$$\theta_3 = \arctan\left[\frac{R_1 \sin(\theta_0 - \theta_1)}{R_1 - R_1 \cos(\theta_0 - \theta_1) + R_1/r}\right]$$

$$x = -\frac{R_1 \sin(\theta_0 - \theta_1)}{\sin \theta_3} \sin(r\theta_1 + \theta_3)$$

$$y = -\frac{R_1 \sin(\theta_0 - \theta_1)}{\sin \theta_3} \cos(r\theta_1 + \theta_3)$$

where:
   $r$ = angular velocity ratio of cam gear and roller gear
   $\theta_o = 2\pi$ radian divided by the number of rollers of roller gear
   $d$ = center distance between cam gear and roller gear
   $\theta_3$ = angle from the center distance line
   $R_1$ = radius of roller gear
   $\theta_1$ = angle varying between $-\beta$ and $2\theta_o + \beta$ in which angle $\beta$ satisfies the following condition:

$$\left(1 + \frac{1}{r}\right)\sin\left(r\beta + \frac{r\theta_0}{2}\right) = \sin\left(\theta_0 + \beta + r\beta + \frac{r\theta_0}{2}\right).$$

2. The gear assembly of claim 1, wherein said roller gear and said cam gear are mounted on a parallel shaft, respectively, and each said roller of said roller gear has a cylindrical shape and each said notch of said adjacent teeth of said cam gear has a surface contour to matingly receive said cylindrical shape.

3. A gear assembly with a constant velocity ratio comprising:
   a roller gear with a plurality of rotatable rollers with each roller having an axis and a radius and being equally spaced apart relative to one another in rotational symmetry; and
   a cam gear in a plane with a plurality of teeth, each tooth having an axis extending perpendicular to said plane of said cam gear to define a cam gear rack, adjacent teeth forming a notch defining a lobular periphery having a pair of sides, said plurality of teeth being equally spaced apart relative to one another in translational symmetry to provide a cam-gear profile such that, in use, upon rotation of said roller gear each said roller rollingly contacts one of said sides of said lobular periphery and rolls along said lobular periphery with at least one of said teeth of said cam gear rack in rolling contact with both a roller of said roller gear in an approach phase and with a roller of said roller gear in a recess phase to provide mechanical communication between said roller gear and said cam gear rack at a constant ratio of translational velocity of said cam gear rack to the angular velocity of said roller gear, a pitch curve of said cam-gear tooth along which said axis of each said roller travels is defined by said cam gear profile distanced by said radius of each said roller from each said cam-gear tooth, and x and y coordinates of said pitch curve in the origin at the center of said roller gear are defined by:

$$x = -R_1\theta_1 - R_1 \sin(\theta_0 - \theta_1)$$

$$y = R_1 \cos(\theta_0 - \theta_1)$$

where:
   $R_1$ = radial distance from rotational center of roller gear to each center of rollers
   $\theta_0 = 2\pi$ radian divided by the number of rollers of roller gear
   $\theta_1$ = angle varying between $-\phi$ and $2\theta_0 + \phi$ in which the angle $\phi$ satisfies the following condition:

$$\sin(\phi + \theta_0) = \phi + \theta_0/2.$$

* * * * *